(12) United States Patent
Johansen

(10) Patent No.: US 7,600,652 B1
(45) Date of Patent: Oct. 13, 2009

(54) MULTIPLE LAYER POLYMERIC CAP AND METHOD OF MAKING THE SAME

(75) Inventor: Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 1477 days.

(21) Appl. No.: 09/606,702

(22) Filed: Jun. 29, 2000

(51) Int. Cl.
*B28B 11/12* (2006.01)
*B29C 39/12* (2006.01)
*B29C 49/00* (2006.01)
*B29C 45/16* (2006.01)

(52) U.S. Cl. .................. 220/586; 220/582; 264/154; 264/536; 264/534; 264/152; 264/248; 264/294

(58) Field of Classification Search ............ 220/586, 220/560.01, 562, 359.1; 264/531, 539, 500, 264/523, 524, 527, 532, 536, 154, 161, 248, 264/152, 250, 294, 534; 215/232
See application file for complete search history.

(56) References Cited

U.S. PATENT DOCUMENTS

| | | | |
|---|---|---|---|
| 3,115,682 A | 12/1963 | Soubier et al. | |
| 3,380,608 A * | 4/1968 | Morbeck | 215/43 |
| 3,409,710 A | 11/1968 | Klygis | |
| 4,197,955 A * | 4/1980 | Luenser | 215/232 |
| 4,405,557 A | 9/1983 | Lehnard | |
| 4,440,824 A | 4/1984 | Bonis | |
| 5,008,066 A * | 4/1991 | Mueller | 264/537 |
| 5,186,875 A | 2/1993 | Fukuhara | |
| 5,213,753 A * | 5/1993 | Przytulla | 264/534 |
| 5,425,470 A * | 6/1995 | Duhaime et al. | 220/62.11 |
| 5,431,292 A * | 7/1995 | Culter et al. | 215/305 |
| 5,567,296 A * | 10/1996 | Luch | 205/158 |
| 5,601,214 A * | 2/1997 | Hendrickson et al. | 222/517 |
| 5,662,245 A * | 9/1997 | Grant | 220/254 |
| 5,762,859 A * | 6/1998 | Kani | 264/523 |
| 5,885,517 A * | 3/1999 | Hendrickson et al. | 264/539 |
| 6,033,749 A * | 3/2000 | Hata et al. | 428/36.7 |
| 6,068,900 A * | 5/2000 | Kohn et al. | 428/35.7 |
| 6,290,094 B1 * | 9/2001 | Arnold et al. | 220/839 |
| 6,467,643 B1 * | 10/2002 | Sadr | 220/562 |

\* cited by examiner

*Primary Examiner*—Anthony D Stashick
*Assistant Examiner*—Niki M Eloshway
(74) *Attorney, Agent, or Firm*—Reising Ethington P.C.

(57) ABSTRACT

A cap is formed within the flash of a molded polymeric article. Desirably, the material of the flash, and hence the cap, has the same properties as the molded article. In one embodiment, the molded article is a multi-layer plastic fuel tank having a vapor barrier layer sandwiched between structural and/or adhesive layers and the cap has the same general construction and may be fixed or welded to the fuel tank over an opening through the tank. Advantageously, the cap is formed in the same process used to form the molded article and reduces the scrap or waste material by utilizing a portion of the flash which is removed from the molded article after it is formed. Therefore, the cost and time to produce a molded article and one or more caps is greatly reduced.

12 Claims, 2 Drawing Sheets

MULTIPLE LAYER POLYMERIC CAP AND METHOD OF MAKING THE SAME

FIELD OF THE INVENTION

This invention relates generally to polymeric containers and more particularly to a cap for a polymeric container and a method of making it.

BACKGROUND OF THE INVENTION

Environmental concerns and regulations have spurred the need to reduce the amount of hazardous hydrocarbon vapors emitted by vehicles and have led to the development of new technologies for manufacturing plastic fuel tanks. A fuel tank constructed from a single layer of a plastic, such as high density polyethylene, has been found to have an unacceptably high permeation rate of fuel vapor therethrough. Therefore, current plastic fuel tanks are formed with multiple layers one of which is a vapor barrier layer and these tanks have reduced the amount of hydrocarbons released into the atmosphere by as much as 60 times over single layer untreated plastic fuel tanks.

A typical multi-layerlayer plastic fuel tank construction comprises an outer layer of high density polyethylene, an inner layer of high density polyethylene, and a vapor barrier layer disposed between them. The vapor barrier layer is typically a polymer such as ethylene vinyl alcohol which requires an adhesive layer adjacent both the outer and inner layers to join the high density polyethylene with the ethylene vinyl alcohol. A multi-layerlayer plastic fuel tank is substantially more difficult to manufacture than a single layer plastic fuel tank and is usually made by a multi-layer extrusion and blow molding process.

Previously, a separate monolayer cap, or a separate multiple layer cap formed by a separate molding process, such as injection molding, has been provided to cover each opening into the fuel tank. Undesirably, the monolayer cap permits fuel vapor to permeate therethrough and the separate molding process to provide a multiple layer cap is relatively costly and time consuming to perform.

SUMMARY OF THE INVENTION

A cap is formed from the flash of a molded polymeric article. Desirably, the material of the flash, and hence the cap, has the same properties as the molded article. In one embodiment, the molded article is a multi-layer plastic fuel tank having a vapor barrier layer sandwiched between structural and/or adhesive layers and the cap has the same general construction and may be fixed or welded to the fuel tank over an opening through the tank. Advantageously, the cap is formed in the same process used to form the molded article and reduces the scrap or waste material by utilizing a portion of the flash which is removed from the molded article after it is formed. Therefore, the cost and time to produce a molded article and one or more caps is greatly reduced.

Objects, features and advantages of this invention include providing a cap which does not require any secondary molding operations, is formed in flash from a molded article to reduce the scrap or waste material of the molded article, is formed simultaneously with the molded article, may have the same construction and characteristics of the molded article, reduces the time and cost to form a cap and molded article, is ideally suited to forming a multi-layer cap for a polymeric fuel tank which may be welded to the fuel tank and which limits the permeation of fuel vapor through the cap, is of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
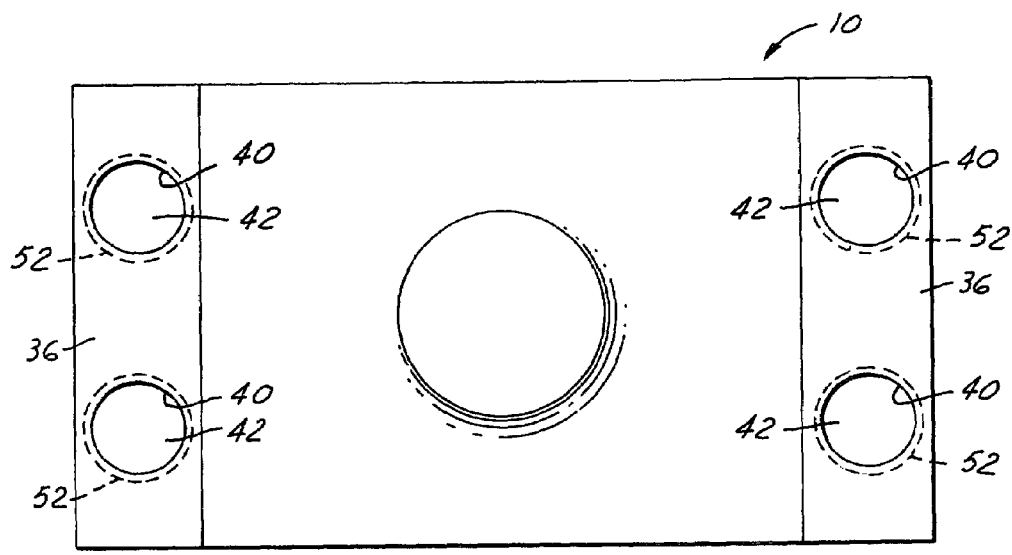
FIG. 1 is a plan view of a molded polymeric fuel tank having flash sections adapted to provide a plurality of caps in accordance with the present invention.
Figure 2:
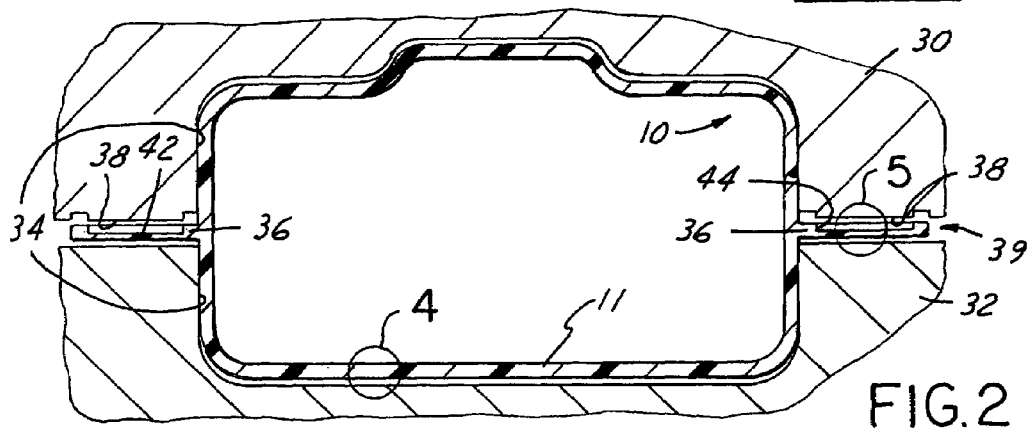
FIG. 2 is a cross sectional view of the fuel tank of FIG. 1 received between a pair of open die halves of a blow molding machine.
Figure 3:
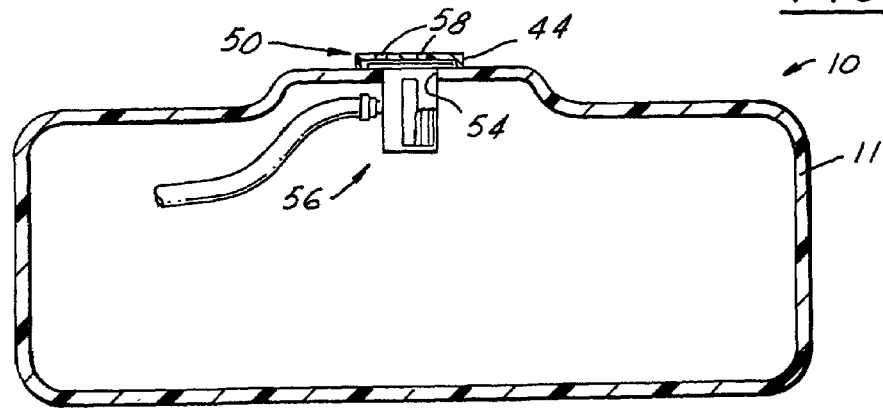
FIG. 3 is a diagrammatic sectional view illustrating a cap formed according to the present invention fixed to a polymeric fuel tank.
Figure 4:
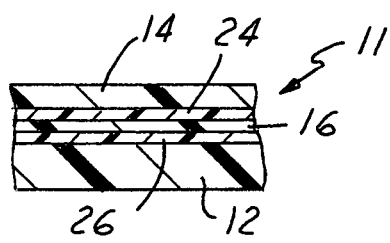
FIG. 4 is an enlarged fragmentary view of the encircled portion 4 in FIG. 2.

Referring in more detail to the drawings, FIGS. 1-3 show a multi-layerlayer molded plastic fuel tank 10 as is commonly used, for example, in the automotive industry. As shown in FIG. 4, the walls 11 of the fuel tank 10 preferably have inner 12 and outer 14 layers formed primarily of polyethylene and an intermediate vapor barrier layer 16 formed of a copolymer such as ethylene vinyl alcohol to reduce the permeation of fuel vapor through the fuel tank 10. The tank walls 11 may be formed by coextruding a parison of the various layers of different materials and blow molding the parison to form the fuel tank. The plastic fuel tanks 10 are particularly desirable because of their light weight, resistance to corrosion, ease of manufacturing and low fuel vapor permeation characteristics.

As shown in FIG. 4, the fuel tank 10 has multiple layers including: an outer layer 14 of high density polyethylene (HDPE) which may also have some carbon black or poly black mixed therein to provide coloration; an outer adhesive layer 24; the vapor barrier layer 16; an inner adhesive layer 26; and an inner layer 12 of virgin high density polyethylene. The vapor barrier layer 16 is preferably ethylene vinyl alcohol (EVOH) and the adhesive layers may be of a wide variety of materials with one current example sold under the trade name ADMER by Evalca, Inc. The inner and outer adhesive layers 24, 26 are necessary to attach the adjacent layers of HDPE to the vapor barrier layer 16 and thereby increase the structural integrity of the fuel tank 10 which is paramount for passing various crush resistance and vehicle crash specifications in the automotive industry. The vapor barrier layer 16 is necessary to reduce the amount of hydrocarbon vapors which would diffuse, permeate or otherwise escape through the fuel tank walls 11 which are composed primarily of HDPE.

A typical multi-layer plastic fuel tank wall 11 has a thickness of between about 2.5 mm and 8 mm, with an optimal total wall thickness of about 5 mm. Nominal values for the individual layers of the multi-layer plastic fuel tank 10 are as follows: the outer layer 14 comprises between about 40 to 50 percent of the total wall thickness; the outer adhesive layer 24 comprises between about 1 to 4 percent of the total wall thickness; the vapor barrier layer 16 comprises between about 2 to 5 percent of the total wall thickness; the inner adhesive layer 26 comprises between about 1 to 4 percent of the total wall thickness; and the inner layer 12 comprises between about 40 and 50 percent of the total wall thickness. These ranges of the thickness of the individual layers are illustrative only, and can be readily varied during the coextrusion of the parison for forming the fuel tank walls 11 during the manufacture of the fuel tanks 10.

To form such a fuel tank 10, preferably the various layers are simultaneously extruded into a generally cylindrical parison which is received in a generally molten state between a pair of die halves 30, 32 of a blow molding machine. When the die halves 30, 32 are closed together they define a main cavity 34 which will provide the desired external shape of the fuel tank 10. After closing the die halves 30, 32 together, a pressurized fluid, such as air, is provided into the interior of the parison through a blow pin in a conventional manner to outwardly expand the parison into engagement with the mold halves 30, 32. The pressure within the parison is maintained until it has cooled at least sufficiently to hold its shape without collapsing. Thereafter, the formed fuel tank 10 is permitted to further cool and harden.

When the die halves 30, 32 of the blow molding machine are closed around a parison disposed between them, a portion of the parison is pinched or trapped between die halves 30, 32 and these trapped portions of the parison will form flash 36 which is conventionally trimmed or machined off of the formed fuel tank 10. The portions of the parison may be trapped between the die halves 30, 32 to close opposed open ends of the generally cylindrical or tubular parison, and/or to retain the position of the parison within the die halves. So formed, the flash 36 has the same multiple layer construction of the fuel tank 10 and indeed, may have two of each layer due to the pinching of the parison between the mold halves 30, 32. Therefore, desirably, the flash may have two vapor barrier layers.

Figure 6:
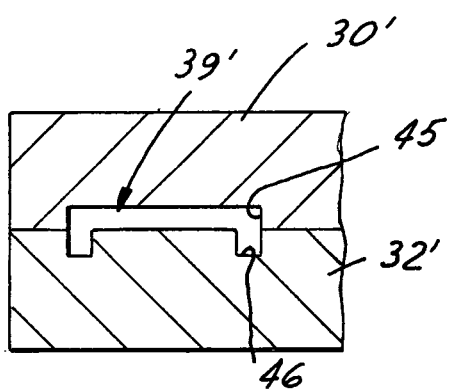
FIG. 6 is a diagrammatic sectional view of a pair of die halves which may be used to form a fuel tank according to the present invention.
Figure 7:
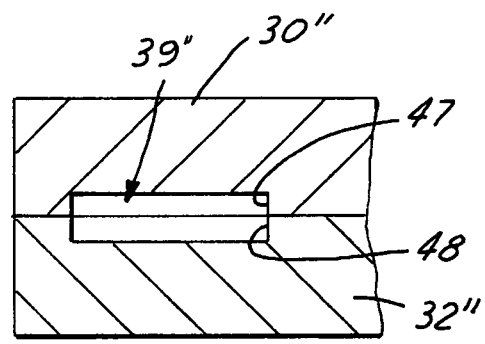
FIG. 7 is a diagrammatic sectional view of a pair of modified die halves which may be used to form a fuel tank according to the present invention.

As shown in FIG. 2, at least one of the die halves 30 is provided with a plurality of projections 38 extending into a gap between the die halves 30, 32 defining a second cavity 39. The projections 38 are constructed and arranged to provide corresponding depressions or recesses 40 in the flash 36. As shown, the recesses 40 are preferably generally circular in cross section and the projections 38 are preferably generally cylindrical with a planar end face and form recesses 40 having a generally flat bottom 42 and a generally cylindrical sidewall 44. As shown in FIG. 6, a second cavity 39' may also be formed between modified die halves 30', 32' having a generally circular recess 45 in the upper die half 30' and an annular recess 46 in the lower die half 32' to provide a flat bottom and cylindrical sidewall formation in the flash 36. As shown in FIG. 7, each mold half 30", 32" may have a separate circular recess 47, 48, respectively, to define a generally cylindrical second cavity 39" and corresponding portion of the flash 36 which may be severed from the remainder of the flash and used as a cap. Other constructions and arrangements of the mold halves may be used to provide a desired shape or form in the flash 36.

As shown, four recesses 40 are provided with two in each of two flash sections 36 on the formed fuel tank 10, although any number of projections or recesses 40 can be formed. A separate cap 50 is formed by stamping or cutting the flash 36 slightly radially outwardly of each recess 40 such as along the dashed lines 52 shown in FIG. 1. As shown in FIG. 3, a cap 50 may be used to cover an opening 54 of the fuel tank, such as an opening to receive a fuel vapor vent valve 56 and/or a fuel pump module or other component internal to the fuel tank.

Figure 5:
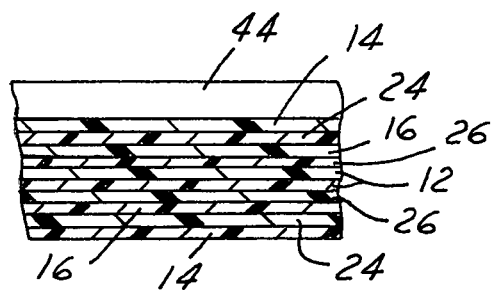
FIG. 5 is an enlarged fragmentary view of the encircled portion 5 of FIG. 2.

Desirably, as shown in FIG. 5, the cap 50 has the multilayer construction of the fuel tank, and may have two of each layer as described with reference generally to the flash 36, to provide one or more layers of high density polyethylene or similar structural material adjacent to the fuel tank and which may be welded thereto such as by hot plate, ultrasonic or other welding methods. The cap 50 also has at least one and preferably two fuel vapor barrier layers 16 which at least substantially prevent permeation of fuel vapor therethrough to reduce the escape to the atmosphere of hazardous hydrocarbon fuel vapors. In use, various openings 58 may be cut through the cap to permit the passage of a fuel line, a fuel vapor line, electrical wires and/or other conduits into the fuel tank 10 as needed.

The cap 50 is formed simultaneously with a blow molded article and within flash sections 36 formed during production of the molded article to reduce the overall waste or scrap material and to eliminate the need for secondary processing operations to form the cap 50. Desirably, the cap 50 may be formed from the same material as the blow molded article and thus, may have the multiple layer construction of the blow molded article and the desirable characteristics of each layer and may even have two of each layer of material.

The invention claimed is:

1. A method of forming a fuel container with an opening and a cap sealing the opening, comprising the steps of:

providing a pair of mold halves defining a first mold cavity to form and define the shape of a container from a parison by blow molding and adjacent the first cavity a second cavity to form at least one cap in a flash section from the parison by compression molding;

providing a parison with a hydrocarbon fuel vapor barrier layer of a polymeric material disposed between inner and outer layers of a different polymeric material which is heat weldable;

closing the mold halves together to receive and compress a portion of the parison between them forming at least one flash section in the region of the second cavity and at least one cap in the second cavity in the flash section by compression molding;

providing a pressurizing fluid into the parison within the closed mold halves to expand the parison within the first mold cavity to form the entire container and define the shape of the container by blow molding;

forming an opening through the container at a location spaced from the cap;

before filling the container, separating the cap from the flash section;

before filling the container, disposing the cap over the opening; and before filling the container, heat welding the cap to the container circumferentially continuously to permanently attach and seal the cap to the container to permanently close, seal and provide a fuel vapor barrier for the opening.

2. The method of claim 1 wherein the parison, container and cap have multiple layers of polymeric material including at least one structural layer and at least one vapor barrier layer.

3. The method of claim 1 which also comprises heat welding at least one of the inner layer and the outer layer of the cap to the outer layer of the container to permanently attach and seal the cap to the container.

4. The method of claim 1 which further comprises simultaneously extruding the fuel vapor layer and the inner and outer layers into the parison which is received in a generally molten state between the open mold halves in a blow molding machine to form the container and cap.

5. The method of claim 4 wherein the inner layer and the outer layer of the parison, container and cap are of a high density polyethylene polymer material.

6. The method of claim 5 wherein layers of high density polyethylene polymer material of the container and the cap are heat welded together to permanently attach and seal the cap to the container.

7. The method of claim 1 wherein the cap has twice as many vapor barrier layers as the vapor barrier layer(s) of the container.

8. A method of forming a fuel container with an opening and a cap sealing the opening, comprising the steps of:
- providing a pair of mold halves defining a first mold cavity to form and define the shape of a container by blow molding and adjacent the first cavity a second cavity to form at least one cap in a flash section by compression molding;
- providing a parison with at least one hydrocarbon fuel vapor barrier layer of a polymeric material disposed between inner and outer layers of a different polymeric material which is heat weldable;
- closing the mold halves together to receive and compress in the second cavity two overlapping portions of the parison between them forming at least one flash section in the region of the second cavity and at least one cap in the flash section by compression molding with the cap having twice as many vapor barrier layers as the vapor barrier layer(s) of the container and two adjacent inner layers of the different polymeric material adhered together;
- providing a pressurizing fluid into the parison within the closed mold halves to expand the parison within the first mold cavity to form the entire container and define the shape of the container by flow molding;
- forming an opening through the container at a location spaced from the cap;
- before filling the container, separating the cap from the flash section;
- before filling the container, disposing the cap over the opening; and
- before filling the container, heat welding the cap to the container circumferentially continuously to permanently attach and seal the cap to the container to permanently close, seal and provide a fuel vapor barrier for the opening.

9. The method of claim 8 which also comprises heat welding at least one of the inner layer and the outer layer of the cap to the outer layer of the container to permanently attach and seal the cap to the container.

10. The method of claim 8 which further comprises simultaneously extruding the at least one fuel vapor layer and the inner and outer layers into the parison which is received in a generally molten state between the open mold in a blow molding machine to form the container and cap.

11. The method of claim 8 wherein the inner layer and the outer layer of the parison, container and cap are of a high density polyethylene polymer material.

12. The method of claim 11 wherein the layers of high density polyethylene polymer material of the container and the cap are heat welded together to permanently attach and seal the cap to the container.

* * * * *